United States Patent
Jiménez

(10) Patent No.: US 12,369,108 B2
(45) Date of Patent: Jul. 22, 2025

(54) WIRELESS DEVICE, NETWORK NODE, AND METHODS PERFORMED THEREBY FOR HANDLING RADIO FREQUENCY BANDS

(71) Applicant: Telefonaktiebolaget LM Ericsson (publ), Stockholm (SE)

(72) Inventor: Jaime Jiménez, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 193 days.

(21) Appl. No.: 17/786,447

(22) PCT Filed: Dec. 17, 2019

(86) PCT No.: PCT/SE2019/051293
§ 371 (c)(1),
(2) Date: Jun. 16, 2022

(87) PCT Pub. No.: WO2021/126022
PCT Pub. Date: Jun. 24, 2021

(65) Prior Publication Data
US 2024/0015638 A1    Jan. 11, 2024

(51) Int. Cl.
*H04W 48/16* (2009.01)
*H04W 48/20* (2009.01)

(52) U.S. Cl.
CPC ......... *H04W 48/16* (2013.01); *H04W 48/20* (2013.01)

(58) Field of Classification Search
CPC ...... H04W 48/16; H04W 48/20; H04W 48/12
(Continued)

(56) References Cited

U.S. PATENT DOCUMENTS 9,301,307 B1   3/2016 Park et al.
2011/0111757 A1*  5/2011 Venkatachalam ..... H04W 48/20
                                                  455/435.2
(Continued)

FOREIGN PATENT DOCUMENTS

EP    1 601 219 A2    11/2005
EP    1 601 219 A3    11/2005

OTHER PUBLICATIONS

Sinche, S. et al., "Towards Effective IoT Management", Oct. 28, 2018, IEEE, XP033477614 (4 pages).
(Continued)

*Primary Examiner* — Mang Hang Yeung
(74) *Attorney, Agent, or Firm* — Rothwell, Figg, Ernst & Manbeck, P.C.

(57) ABSTRACT

A method performed by a wireless device (130) for handling radio frequency bands. The wireless device (130) operates in a communications network (10). The wireless device (130) sends (203) an indication to a network node (110) operating in the 5 communications network (10). The indication indicates a first radio frequency band the wireless device (130) is configured with to scan for discovery and selection of a cell operating in the communications network (10). The wireless device (130) then receives (204) another indication from the network node (110). The another indication comprises a first instruction to configure the wireless device (130) to use a second radio frequency 10 band to scan for cell discovery and selection. The sending (203) and the receiving (204) are performed using an internet protocol.

24 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2016/0353460 A1 | 12/2016 | Balakrishnan et al. | |
| 2017/0202047 A1* | 7/2017 | Tiwari | H04W 72/20 |
| 2018/0102934 A1* | 4/2018 | Ly | H04L 67/146 |
| 2018/0206188 A1 | 7/2018 | Nam et al. | |

OTHER PUBLICATIONS

Calhoun, P. et al., "Lightweight Access Point Protocol", Feb. 22, 2010, Independent Submission, Request for Comments: 5412, Category: Historic, ISSN: 2070-1721, XP015068191 (125 pages).

International Search Report and Written Opinion with Transmittal dated Oct. 30, 2020 in International Application No. PCT/SE2019/051293 (13 pages).

Gemalto N.V., "Considerations on NB-IoT cell selection", R2-1816426, 3GPP TSG-RAN WG2 Meeting #104, Spokane, US, Nov. 12-16, 2018 (3 pages).

Slovetskiy, S. et al., "White Paper Lightweight M2M 1.1: Managing Non-IP Devices in Cellular IoT Networks", Oct. 2018, T-Mobile and Ericsson (21 pages).

Jennings, C. et al., "Sensor Measurement Lists (SenML)", Internet Engineering Task Force (IETF), Request for Comments: 8428, Category: Standards Track, ISSN: 2070-1721, Aug. 2018 (54 pages).

Open Mobile Alliance, "Lightweight Machine to Machine Technical Specification: Core", Approved Version: 1.1—Jul. 10, 2018, OMA-TS-LightweightM2M_Core-V1_1-20180710-A, OMA SpecWorks, Aug. 6, 2018 (142 pages).

Open Mobile Alliance, "Lightweight Machine to Machine Technical Specification: Transport Bindings", Approved Version: 1.1.1—Jun. 17, 2019, OMA-TS-LightweightM2M_Transport-V1_1_1-20190617-A, OMA SpecWorks, Jun. 25, 2019 (71 pages).

"LTE frequency bands", Wikipedia, May 5, 2022 (7 pages).

Shelby, Z. et al., "The Constrained Application Protocol (CoAP)", Internet Engineering Task Force (IETF), Request for Comments: 7252, Category: Standards Track, ISSN: 2070-1721, Jun. 2014 (112 pages).

* cited by examiner a)

b)

a)

b)

a)

b)

WIRELESS DEVICE, NETWORK NODE, AND METHODS PERFORMED THEREBY FOR HANDLING RADIO FREQUENCY BANDS

CROSS REFERENCE TO RELATED APPLICATION(S)

This application is a 35 U.S.C. § 371 National Stage of International Patent Application No. PCT/SE2019/051293, filed Dec. 17, 2019.

TECHNICAL FIELD

The present disclosure relates generally to a wireless device and methods performed thereby for handling radio frequency bands. The present disclosure also relates generally to a network node, and methods performed thereby for handling radio frequency bands. The present disclosure further relates generally to a computer program product, comprising instructions to carry out the actions described herein, as performed by the wireless device, or the network node. The computer program product may be stored on a computer-readable storage medium.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, such as radio network node or Base Station (BS), which sometimes may be referred to as e.g., Transmission Point (TP), Radio Base Station (RBS), gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC or 5G CN.

Internet of Things (IoT)

The Internet of Things (IoT) may be understood as an internetworking of communication devices, e.g., physical devices, vehicles, which may also referred to as "connected devices" and "smart devices", buildings and other items— embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use Wi-Fi for remote monitoring. These devices may collect data with the help of various existing technologies and then autonomously flow the data between other devices.

Machine Type Communication (MTC)

Machine Type Communication (MTC) has, especially in the context of the Internet of Things (IoT), shown to be a growing market segment. An MTC device may be a communication device, typically a wireless communication device or simply wireless device, that is a self and/or automatically controlled unattended machine and that is typically not associated with an active human user in order to generate data traffic. An MTC device may be typically more simple, and typically associated with a more specific application or purpose, than, and in contrast to, a conventional mobile phone or smart phone.

MTC involves communication in a wireless communication network to and/or from MTC devices, in which communication typically may be of quite different nature and with other requirements than communication associated with e.g. conventional mobile phones and smart phones. In the context of the IoT it is evident that MTC traffic will be increasing and thus needs to be increasingly supported in wireless communication systems.

Constrained Application Protocol (CoAP)

Some of the devices that may make use of IoT or MTC may be considered constrained devices. A constrained device or constrained node may be understood as a node where some of the characteristics of Internet nodes may not be attainable, often due to cost constraints and/or physical constraints on characteristics such as size, weight, and available power and energy. For example, a constrained device may be a sensor in a car or in a building.

The Constrained Application Protocol (CoAP) may be understood as a generic Representational State Transfer (REST)-based application-layer protocol for devices with constraints on system resources like processing power and memory size (https://tools.ietf.org/html/rfc7252). It may be understood as defined in RFC7252. CoAP may be considered to enable constrained devices to communicate with the wider Internet using similar protocols.

On current deployments, CoAP-based solutions such as Open Mobile Alliance (OMA) Lightweight Machine to Machine Protocol (LWM2M) are becoming increasingly popular in order to manage devices in a REST-based fashion.

LWM2M may be understood to provide a simple mechanism for device management of IoT Devices. It may provide interfaces for Information Reporting, Service Enablement, Firmware Updates and a generic way to securely manage a device.

3GPP has defined a radio technology named Narrowband Internet of Things (NB-IoT). NM-IoT may be understood to use a Low Power Wide Area Network (LPWAN) radio technology to connect cellular IoT devices.

To some extent, the Device Management protocol LwM2M may be able to configure devices to tailor to different use cases. However, normally constrained devices may come with default configurations that are sometimes hard to modify.

Current configuration efforts are oriented more to radio network properties or application specific configuration. Great care is being placed on securing the identity of the device, its network security, and controlling the access to it. However, it is currently not possible to configure various application layer parameters that affect the performance.

SUMMARY

It is an object of embodiments herein to improve the handling of radio frequency bands by wireless devices in a communications network. It is a particular object of embodiments herein to improve the handling of radio frequency bands by constrained wireless devices in a communications network.

According to a first aspect of embodiments herein, the object is achieved by a method performed by a wireless device. The wireless device operates in a communications network. The wireless device sends an indication to a network node operating in the communications network. The indication indicates a first radio frequency band the wireless device is configured with to scan for discovery and selection of a cell operating in the communications network. The wireless device then receives another indication from the network node. The another indication comprises a first instruction to configure the wireless device to use a second radio frequency band to scan for cell discovery and selection. The sending and the receiving are performed using an internet protocol According to a second aspect of embodiments herein, the object is achieved by a method performed by the network node. The network node operates in the communications network. The network node receives the indication from the wireless device operating in the communications network. The indication indicates a first radio frequency band the wireless device is configured with to scan for discovery and selection of a cell operating in the communications network. The network node sends another indication to the wireless device. The another indication comprises the first instruction to configure the wireless device to use a second radio frequency band to scan for cell discovery and selection. The receiving and the sending are performed using an internet protocol.

According to a third aspect of embodiments herein, the object is achieved by the wireless device, configured to operate in the communications network. The wireless device is configured to send the indication to the network node configured to operate in the communications network. The indication is configured to indicate the first radio frequency band the wireless device is configured with to scan for discovery and selection of a cell configured to operate in the communications network. The wireless device is further configured to receive the another indication from the network node. The another indication comprises the first instruction to configure the wireless device to use the second radio frequency band to scan for cell discovery and selection. To send and to receive are configured to be performed using the internet protocol.

According to a fourth aspect of embodiments herein, the object is achieved by the network node, configured to operate in the communications network. The network node is further configured to receive the indication from the wireless device configured to operate in the communications network. The indication is configured to indicate the first radio frequency band the wireless device is configured with to scan for discovery and selection of a cell configured to operate in the communications network. The network node is further configured to send the another indication to the wireless device. The another indication comprises the first instruction to configure the wireless device to use the second radio frequency band to scan for cell discovery and selection. To receive and to send are configured to be performed using an internet protocol.

According to a fifth aspect of embodiments herein, the object is achieved by a computer program, comprising instructions which, when executed on at least one processor, cause the at least one processor to carry out the method performed by the wireless device.

According to a sixth aspect of embodiments herein, the object is achieved by a computer-readable storage medium, having stored thereon the computer program, comprising instructions which, when executed on at least one processor, cause the at least one processor to carry out the method performed by the wireless device.

According to a seventh aspect of embodiments herein, the object is achieved by a computer program, comprising instructions which, when executed on at least one processor, cause the at least one processor to carry out the method performed by the network node.

According to an eighth aspect of embodiments herein, the object is achieved by a computer-readable storage medium, having stored thereon the computer program, comprising instructions which, when executed on at least one processor, cause the at least one processor to carry out the method performed by the network node.

By sending the indication indicating the first radio frequency band to the network node, the wireless device enables the network node to determine whether the first radio frequency band is the most optimal for the wireless device to use based on the one or more policies of the communications network. If it is not, the network node is then enabled to determine the second radio frequency band and to indicate it to the wireless device by sending the another indication to it using an internet protocol. Hence, reconfiguration of the wireless device, which may be a constrained devices is enabled, such that it is enabled to optimize its scanning for discovery and selection of a cell. As a result, communication with the wireless device is improved, making the use of the time-frequency resources in the network in a more efficient manner, as well as using the energy resources of the wireless device more efficiently.

BRIEF DESCRIPTION OF THE DRAWINGS

Examples of embodiments herein are described in more detail with reference to the accompanying drawings, according to the following description.

DETAILED DESCRIPTION

As part of the development of embodiments herein, a problem with exiting methods will first be identified and discussed.

As explained earlier, in existing methods, the functionality of constrained devices to is rather basic, given the limited capabilities of these devices. In particular, it is currently not possible to configure various application layer parameters that affect the performance of such devices. For example, in some IoT scenarios with NB-IoT, there is a problem of selecting the right cell when there are overlapping cells. Devices tend to boot up and select the first available cell. When the device is booting up, the cell selection mechanism is such that it starts scanning through different bands, the device may therefore end up connecting to a cell which is not really the strongest one. Since constrained devices may be typically stationary devices, which may not detect a different cell simply by moving around, it would be convenient to have a possibility to configure such devices, so that they may be enabled to perform cell selection differently.

Several embodiments are comprised herein, which address the limitations of the existing methods. As an overview, embodiments herein may be understood to be drawn to enabling reconfiguration of constrained devices, which lack such capability. In general, embodiments herein may be understood as relating to reconfiguration of devices over LWM2M. In particular, embodiments herein may be understood to enabling reconfiguration of frequency band parameters in a constrained wireless device. Further particularly, embodiments herein may be considered to be related to band tuning LwM2M endpoints for NB-IoT networks.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

Figure 1:
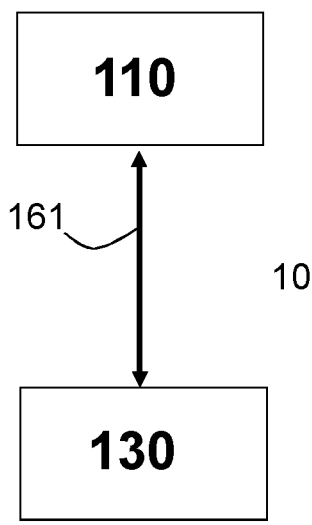
FIG. 1 is a schematic diagram illustrating two non-limiting examples in a) and b), respectively, of a communications network, according to embodiments herein.
Figure 1:
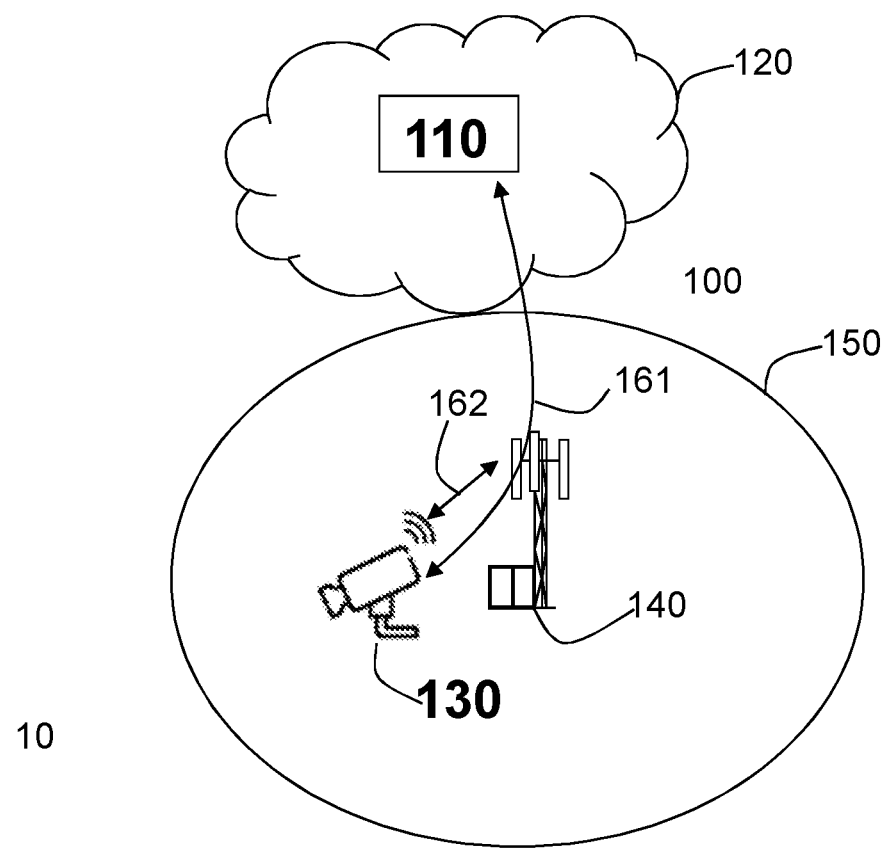

FIG. 1 depicts two non-limiting examples, in panels "a" and "b", respectively, of a communications network 10, in which embodiments herein may be implemented. In some example implementations, such as that depicted in the non-limiting example of FIG. 1a), the communications network 10 may be a computer network. In other example implementations, such as that depicted in the non-limiting example of FIG. 1b), the communications network 10 may be implemented in a telecommunications network 100, sometimes also referred to as a cellular radio system, cellular network or wireless communications system. In some examples, the telecommunications network 100 may comprise network nodes which may serve receiving nodes, such as wireless devices, with serving beams.

The telecommunications network 100 may for example be a Narrow-Band IoT (NB-IoT) network, a Category M1 (CATM) network, a Global System for Mobile communications (GSM) network, or another Internet service provider (ISP)-oriented network.

In some examples, the telecommunications network 100 may for example be a network such as 5G system, or Next Gen network. The telecommunications network 100 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

The communications network 10 comprises a plurality of network nodes, whereof a network node 110 is depicted in FIG. 1. The network node 110 may be understood as a computer system. The network node 110 may be understood to have a capability to communicate with communication devices being constrained devices. In typical examples, the network node 110 may be a LightWeight Machine to Machine protocol (LWM2M) server. In some examples, the network node 110 may support operation on the CoAP and on the DNS protocol.

In some examples, the network node 110 may be implemented, as depicted in the non-limiting example of FIGS. 1a) and 1b), as a standalone server in e.g., a host computer in the cloud 120. The network node 110 may in some examples be a distributed node or distributed server, with some of its functions being implemented locally, e.g., by a client manager, and some of its functions implemented in the cloud 120, by e.g., a server manager. Yet in other examples, the network node 110 may also be implemented as processing resources in a server farm. The network node 110 may be under the ownership or control of a service provider, or may be operated by the service provider or on behalf of the service provider.

The communications network 10 comprises a wireless device 130, as depicted in the non-limiting example scenario of FIG. 1. The communications network 10 may also comprise other communication devices. The wireless device 130 may be a UE or a Customer Premises Equipment (CPE) which may be understood to be enabled to communicate data, with another entity, such as a server, a laptop, a Machine-to-Machine (M2M) device, device equipped with a wireless interface, or any other radio network unit capable of communicating over a wired or radio link in a communications system such as the communications network 10. In some embodiments, the wireless device 130 may be understood to be a constrained device in e.g., an IoT network. In some particular embodiments, the wireless device 130 may be understood to be a constrained device operating on LWM2M. The wireless device 130 may run a client application, which may be enabled to communicate with a host application run by the wireless device 130. The wireless device 130 may be understood to lack a capability to directly query the network node 110. For example, the wireless device 130 may support operation on CoAP.

The wireless device 130 may be a wireless device comprised in the communications network 10, such as a Bluetooth Low Energy (BLE) User Equipment (UE). The wireless device 130 may be enabled to communicate wirelessly in the communications network 10 and, in some particular examples, may be able support beamforming transmission. The communication may be performed e.g., via a RAN and possibly one or more core networks, comprised within the communications network 10.

The wireless device 130 may be also e.g., a mobile terminal, wireless terminal and/or mobile station, mobile telephone, cellular telephone, or laptop, just to mention some further examples. The wireless device 130 may be, for example, portable, pocket-storable, hand-held, computer-comprised, a sensor, camera, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles or any other radio network unit capable of communicating over a wired or radio link in the communications network 10.

The telecommunications network 100 may cover a geographical area which, which in some embodiments may be divided into cell areas, wherein each cell area may be served by a radio network node 140, although, one radio network node may serve one or several cells. In the example of FIG. 1b, the radio network node 140 serves a cell 150. The radio network node 140 may be e.g., a gNodeB. That is, a transmission point such as a radio base station, for example an eNodeB, or a Home Node B, a Home eNode B or any other network node capable to serve a wireless device, such as a user equipment or a machine type node in the communications network 10. The radio network node 140 may be of different classes, such as, e.g., macro eNodeB, home eNodeB or pico base station, based on transmission power and thereby also cell size. In some examples, the radio network node may serve receiving nodes with serving beams. The radio network node 140 may support one or several communication technologies, and its name may depend on the technology and terminology used. Any of the radio network nodes that may be comprised in the communications network 10 may be directly connected to one or more core networks.

The network node 110 is configured to communicate within the communications network 10 with the wireless device 130 over a first link 161, e.g., a radio link, an infrared link, or a wired link. The first link 161 may be comprised of a plurality of individual links. The wireless device 130 is configured to communicate within the communications network 10 with the radio network node 140, in the cell 150, over a second link 162, e.g., a radio link, an infrared link, or a wired link. The second link 162 may be comprised of a plurality of individual links.

The first link 161 may be a direct link or it may go via one or more computer systems or one or more core networks in the communications network 10, which are not depicted in FIG. 1, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 1.

In general, the usage of "first", "second", etc. herein may be understood to be an arbitrary way to denote different elements or entities, and may be understood to not confer a cumulative or chronological character to the nouns they modify.

Figure 2:
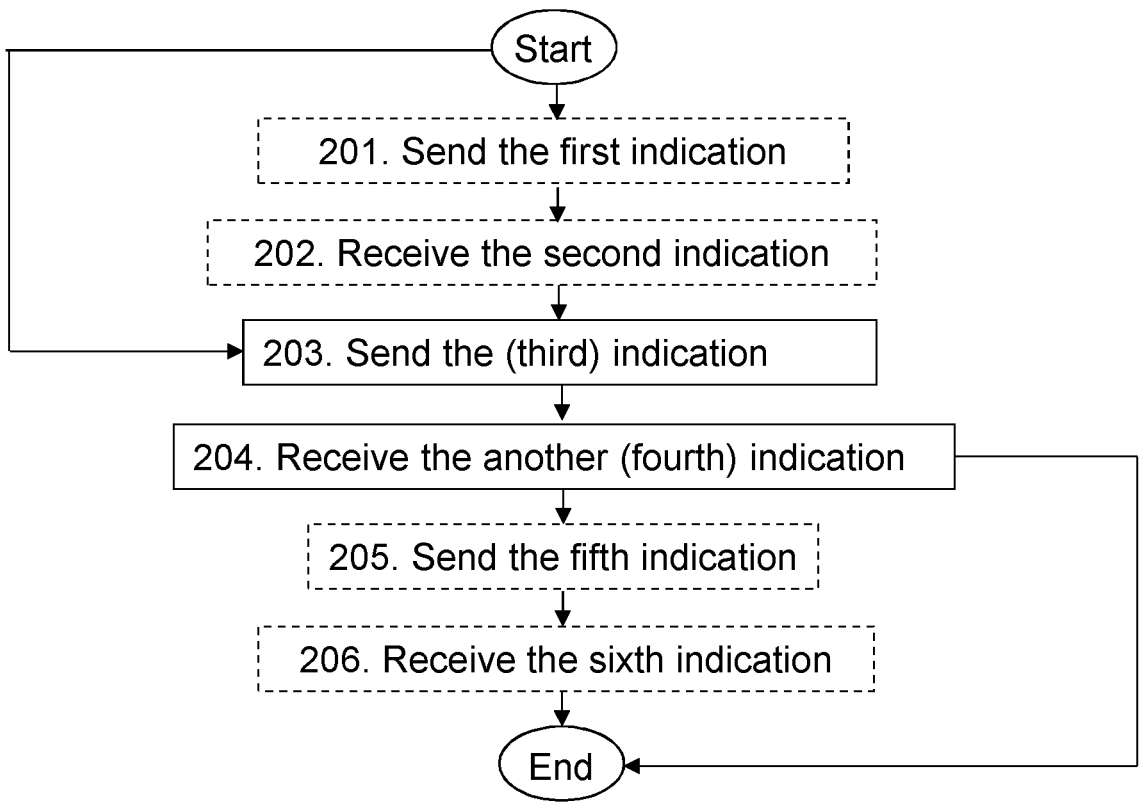
FIG. 2 is a flowchart depicting embodiments of a method in a wireless device, according to embodiments herein.

Embodiments of method performed by the wireless device 130 will now be described with reference to the flowchart depicted in FIG. 2. The method may be understood to be for handling radio frequency bands. The wireless device 130 operates in the communications network 10.

In some embodiments, the communications network 10 may operate on an Internet-of-Things technology. In particular, communications network 10 may operate on NB-IoT.

In some embodiments, the wireless device 130 may be a constrained device. In some embodiments, the wireless device 130 may be a constrained device operating on NB-IoT that may use the LWM2M protocol. The wireless device 130 may run a client application capable of requesting resources or services from a host application run by the network node 110.

The method may comprise the actions described below. Several embodiments are comprised herein. In some embodiments some of the actions may be performed. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 2, optional actions are indicated with dashed boxes.

Action 201

In the course of operations of the communications network 10 the wireless device 130 may, in this Action 201, send a first indication to the network node 110. The first indication may indicate a capability to reconfigure a first configuration for a radio frequency band based on an instruction from the network node 110.

The sending, e.g., providing, in this Action 201 may be performed, e.g., via the first link 161.

The radio frequency band may be, for example, used in the second link 162 between the wireless device 103 and the radio network node 140.

This Action 201 may be performed since the capability may not be mandatory to implement. Therefore, by sending the first indication in this Action 201, the wireless device 130 may enable the network node 110 to discover whether this capability is available at the wireless device 130.

In some examples, the wireless device 130 may send the first indication during the course of a Bootstrapping and Registration procedures, as e.g., specified by the Open Mobile Alliance Device Management (OMA DM)-LWM2M. The Bootstrapping procedure may be understood to be used to onboard an IoT device into a management system, providing key material that may be necessary to establish a secure channel. The registration procedure may be understood to allow the network node 110, e.g., a manager, to know which are the properties of the device, the measurements it may be able to take, when it may be able to take them, etc. These procedures will be briefly described later.

In some examples, the wireless device 130 may be an LwM2M Client and the network node 110 may be an LwM2M Server. The first indication may be, for example a "2.05 Content" response comprising a "/band-config" content. The first indication may be sent in this Action 201 as a response (Res) to a request (Req) from the network node 110 to discover whether the capability may be available at the wireless device 130", as shown below:

Int: LS→LC
Req: GET coap://[IPv6]/.well-known/core
Res: 2.05 Content
</band-config>;rt="oma.lwm2m";ct=110

The capability of the wireless device 130 may be in accordance with a new Band Configuration Object according to embodiments herein, the new Band Configuration Object comprising at least a Band Configuration Parameter and an executable resource that may enable the wireless device 130, as e.g., per indication by the network node 110, to change radio frequency band. This new Band Configuration Object may be preconfigured in both of the wireless device 130 and the network node 110, which may know how to parse it. The new Band Configuration Object according to embodiments herein may be as follows:

| OBJECT: LwM2M Band-CONFIG | |
| --- | --- |
| +--ro BAND-CONFIG* [instance_number] | |
| +--ro instance_number | uint16 |
| +--rw Band | uint16 |
| +--rw Default Min Band | uint16 |
| +--rw Default Max Band | uint16 |
| +--rw Default timeout | decimal64 |
| +---x Reboot | |

In the object, rw may be understood to designate configuration data, and may be enabled to be read and write, ro may be understood to designate state data, and may be enabled to be read only, x may be understood to designate to an action.

The Band may be defined in the Band object. An unit 16, an integer value, may be used to extend for, that is, to indicate, other bands. As an example, if LTE is used, band 26 may be "extended cellular". Default min/max band may be understood as parameters that may define the minimum and maximum radio frequency band the network node 110 may want the wireless device 130 to use.

Timeout may be understood to designate the time the network node 110 may want to wait until the reboot is executed.

Reboot may be understood to designate a command to the wireless device 130, that is, an executable resource, to trigger the timeout to reboot.

Other configuration parameters may be added later on.

According to the foregoing, the content of the "/band-config" may be the object "LWM2M Band-Config", as shown below:

The sending of the first indication in this first Action 201 may be performed after the wireless device 130 may have registered with the network node 110.

The sending of the first indication in this first Action 201 may be performed after the wireless device 130 may have registered with the network node 110. In some examples, the sending in this Action 301 may be performed during a procedure of the wireless device 130 in the communications network 10 selected from: bootstrapping, device management, service enablement, and firmware update.

Action 202

In this Action 202, the wireless device 130 may receive a second indication from the network node 110 in response to sending the first indication in Action 201. The second indication may indicate a request to provide the first configuration. For example, the second indication, may be a a GET operation on the object "LWM2M Band-Config" described in Action 201, such as:

Int: LS→LC
Req: GET coap://[IPv6]/band-config

The receiving, e.g., obtaining, in this Action 202 may be performed, e.g., via the first link 161.

Action 203

In this Action 203, the wireless device 130 sends an indication to the network node 110 operating in the communications network 10. The indication indicates a first radio frequency band the wireless device 130 is configured with to scan for discovery and selection of a cell operating in the communications network 10.

The first radio frequency band may be, for example, used in the second link 162 between the wireless device 103 and the radio network node 140.

The indication may be understood to be a third indication.

The indication may be sent in a 2.05 content response. The third indication may be, for example, a "2.05 Content" response (Res) to the Request (Req) from the network node 110 received in Action 202. The a "2.05 Content" response may be with the following SenML, indicating that it uses band 25 and that has a timeout of 5 seconds before reboot:

Res: 2.05 Content
{"bn": "/XXXX/0/",
"e": [
{"n": "0", "v": 25},
{"n": "1", "v": 25},
{"n": "2", "v": 27},
{"n": "3", "v": 5},
{"n": "4", "v": " "},]}

The sending, e.g., providing, in this Action 203 may be performed, e.g., via the first link 161.

In some embodiments, the sending in this Action 203 may be performed during a procedure of the wireless device 130 in the communications network 10 selected from: bootstrapping, device management, service enablement, and firmware update.

Action 204

Having sent the third indication to the network node 110, the wireless device 130, in this Action 204, receives another indication from the network node 110. The another indication comprises a first instruction to configure the wireless device 130 to use a second radio frequency band to scan for cell discovery and selection. The sending 203 and the receiving 204 are performed using an internet protocol. The another indication may be understood as enabling fine-tuning of the wireless device 130 in case for example the first radio frequency band is determined not to be a suitable configuration for the wireless device 130 in the communications network 10, e.g., in case of overlapping networks, where the first radio frequency band may be congested.

The second radio frequency band may be, for example, used in the second link 162 between the wireless device 103 and the radio network node 140.

In some embodiments, the internet protocol may be one of: a) LwM2M, b) YANG, c) RESTCONF, d) TR-69, and e) Simple network management protocol (SNMP). One of skill in the art may understand that younger or other internet protocols with similar functionality may be also used as internet protocol.

The another indication may be understood to be a fourth indication. The first instruction may be understood as a first example of the instruction from the network node 110 mentioned in Action 201, based on which the wireless device 130 may have indicated to have the capability to reconfigure the first configuration for the radio frequency band.

In some embodiments, wherein the internet protocol may be LwM2M, the another indication, may be a POST message. For example, the another indication may be a Sensor Markup Language (SenML) to indicate a change to the first radio frequency band to 26:

```
Int: LS -> LC
Req: PATCH coap://[IPv6]/band-config
    {"bn": "/XXXX/0/",
     "e": [{"n": "0","v": 26}]
    }
```

In other examples of embodiments herein, other LwM2M parameters, such as Battery, may be used as the another indication to perform band changes to better accommodate the current battery of the wireless device 130. That is, for example, thresholds may be set, so that when the battery is too low, that may trigger to use other frequencies that consume may less bandwidth, increase paging time or even turn on the radio altogether.

The wireless device 130 may only be configured to use the first radio frequency band based on a fixed rule, and the wireless device 130 may only be enabled to use a radio frequency band other than the first radio frequency band to scan for cell discovery and selection by receiving the another indication from the network node 110.

In some embodiments, the sending in Action 203 and the receiving in this Action 204 may be performed during a procedure of the wireless device 130 in the communications network 10 selected from: bootstrapping, device management, and service enablement, firmware update.

The receiving in this Action 204 may be performed over e.g., the first link 161.

Action 205

As stated earlier, the indication may be understood to be a third indication and the another indication may be understood to be a fourth indication. In some embodiments, the wireless device 130 may, in this Action 205, send a fifth indication to the network node 110. The fifth indication may confirm the reconfiguration of the wireless device 130 with the second radio frequency band. For example, the fifth indication may be a "2.04 Changed" response to indicate a successful change of the parameter:

Res: 2.04 Changed

The sending, in this Action 205 may be performed over e.g., the first link 161.

Action 206

In this Action 206, the wireless device 130 may receive a sixth indication from the network node 110. The sending in this Action 206 may be in response to sending the fifth indication in Action 205. The sixth indication may instruct the wireless device 130 to reboot. For example, the sixth indication may be a POST message on a "Reboot Operation" resource.

```
Int: LS→LC
Req: POST coap://[IPv6]/band-config/0/5
    {"n": "11", "v": " "}
```

The receiving in this Action 206 may be performed over e.g., the first link 161.

Figure 3:
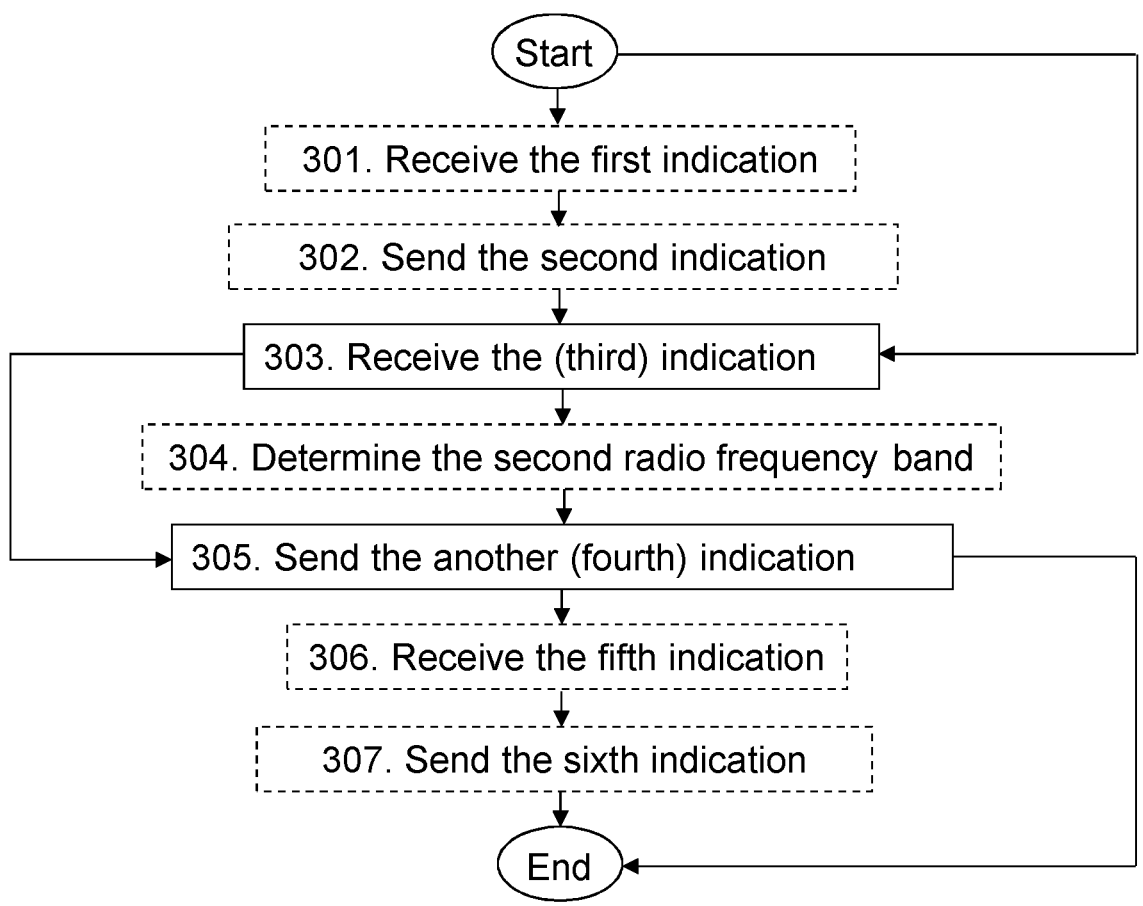
FIG. 3 is a flowchart depicting embodiments of a method in a network node, according to embodiments herein.

Embodiments of a method performed by the network node 110, will now be described with reference to the flowchart depicted in FIG. 3. The method may be understood to be for handling radio frequency bands. The network node 110 operates in the communications network 10.

In some embodiments, the communications network 10 may operate on an Internet-of-Things technology. In particular, communications network 10 may operate on NB-IoT.

The method may comprise one or more of the following actions. Several embodiments are comprised herein. In some embodiments all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with dashed boxes.

The detailed description of some of the following corresponds to the same references provided above, in relation to the actions described for the network node 110, and will thus not be repeated here to simplify the description. For example, the network node 110 may be an LWM2M server. The network node 110 may run a host application capable of sharing its resources with a client application run by the wireless device 130, which may be a constrained device.

Action 301

In this Action 301, the network node 110 receives the first indication from the wireless device 130. The first indication may indicate the capability, of the wireless device 130, to reconfigure the first configuration based on an instruction from the network node 110. As described earlier, in some examples, the network node 110 may receive the first indication during the course of a Bootstrapping and Registration procedures, as e.g., specified by the OMA DM-LWM2M.

The receiving in this Action 301 may be performed, e.g., via the first link 161.

Action 302

In some embodiments, the network node 110 may, in this Action 302, send, the second indication to the wireless device 130 in response to receiving 301 the first indication. The second indication may indicate the request to provide the first configuration.

The sending in this Action 302 may be performed, e.g., via the first link 161.

Action 303

The network node 110, in this Action 303, receives the indication from the wireless device 130 operating in the communications network 10. The indication indicates the first radio frequency band the wireless device 130 is configured with to scan for discovery and selection of a cell operating in the communications network 10, such as the cell 150.

As stated earlier, the indication may be considered a third indication.

The indication may be received in a 2.05 content response.

The receiving in this Action 303 may be performed using an internet protocol. The internet protocol may be one of: a) LwM2M, b) YANG, c) RESTCONF, d) TR-69, and e) SNMP.

The receiving, e.g., obtaining, in this Action 303 may be performed over e.g., the first link 161.

In some embodiments, the receiving in this Action 303 may be performed during a procedure of the wireless device 130 in the communications network 10 selected from: bootstrapping, device management, service enablement, and firmware update.

Action 304

In this Action 304, the network node 110 determines, based on the received indication, the second radio frequency band to indicate to the wireless device 130. The determining in this Action 304 may be further based on one or more policies, e.g., of the communications network 10. The one or more policies may be understood as a set of one or more rules in the communications network 10. For example, the one or more policies may specify a configuration of the communications network 10 to have devices connect to specific bands depending on device type, location or battery. For example, low power devices distributed sparsely may connect at will to the default band. Devices in a high density area may apply policies that assign bands to avoid congestion. The policy may even be arbitrary, assigning different bands to each device.

Determining may be understood as e.g., calculating.

Action 305

In this Action 305, the network node 110 sends another indication to the wireless device 130. The another indication comprises the first instruction to configure the wireless device 130 to use a second radio frequency band to scan for cell discovery and selection. The receiving in Action 303 and the sending in this Action 305 may be performed using an internet protocol. As stated earlier, the internet protocol may be one of: a) LwM2M, b) YANG, c) RESTCONF, d) TR-69, and e) SNMP.

The sent another indication may indicate the determined second radio frequency band.

In some embodiments, the receiving 303 and the sending 305 may be performed during the bootstrapping procedure of the wireless device 130 in the communications network 10.

As stated earlier, the indication may be the third indication, and the another indication may be the fourth indication.

The sending, e.g., providing, in this Action 305 may be performed over e.g., the first link 161.

As explained above, the wireless device 130 may be only configured to use the first radio frequency band during the bootstrapping procedure based on a fixed rule, and the wireless device 130 may only be enabled to use a radio frequency band other than the first radio frequency band to scan for cell discovery and selection by the network node 110 sending the another indication to the wireless device 130.

Action 306

In this Action 306, the network node 110 may receive the fifth indication from the wireless device 130. The fifth indication may confirm the reconfiguration of the wireless device 130 with the second radio frequency band.

The receiving in this Action 306 may be performed over e.g., the first link 161.

Action 307

In this Action 307, the network node 110 may send the sixth indication to the wireless device 130, in response to receiving in Action 306 the fifth indication. The sixth indication may instruct the wireless device 130 to reboot.

Figure 4:
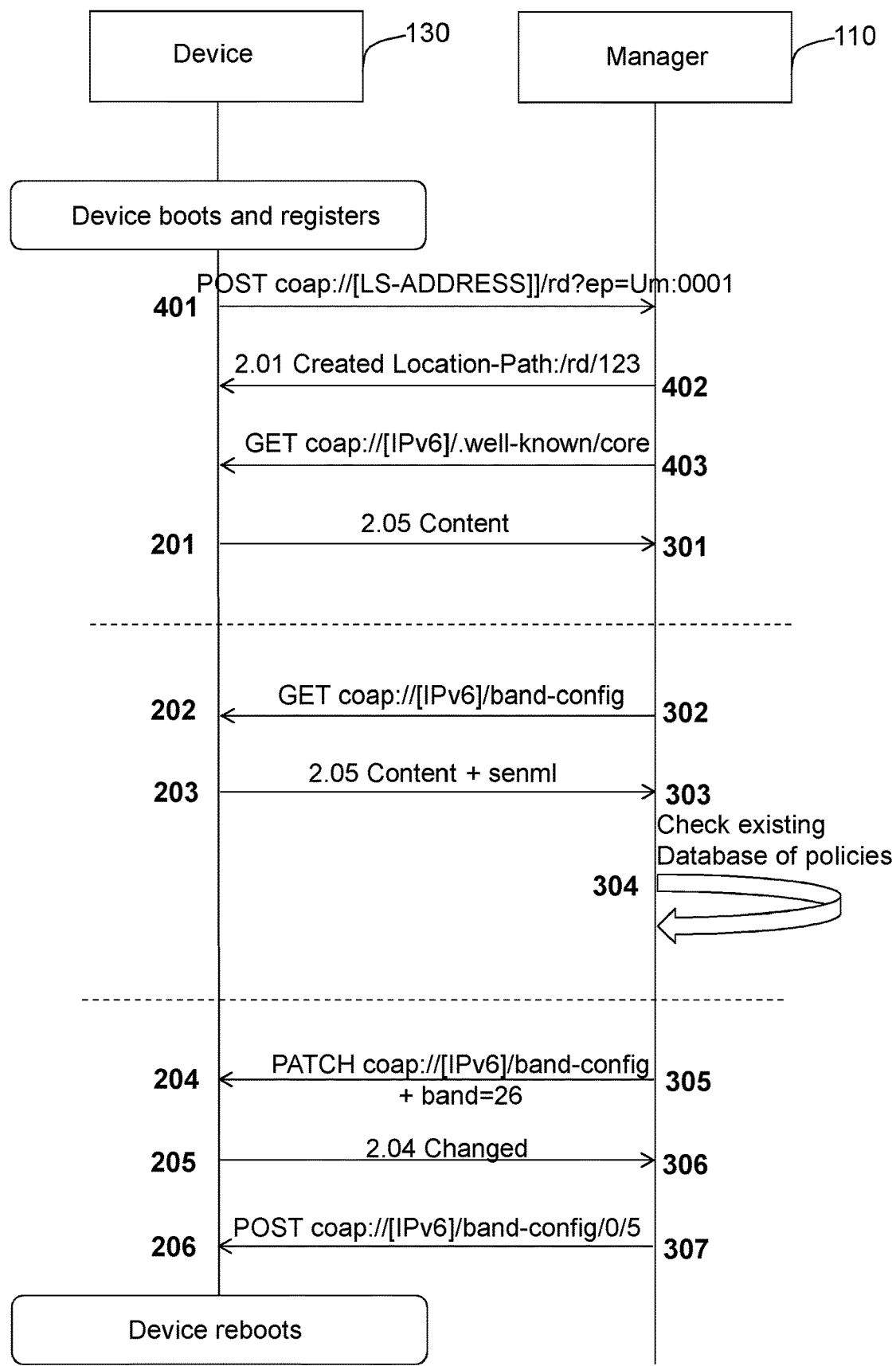
FIG. 4 is a flowchart depicting embodiments of a method in a communications network according to embodiments herein.

The methods just described as being implemented by the wireless device 130 and the network node 110 will now be described in further detail next, in relation to FIG. 4, with a particular non-limiting example, wherein the general process of embodiments herein is tied to LwM2M Device (http://www.openmobilealliance.org/release/LightweightM2M/V1_1-20180710-A/HTML-Version/OMA-TS-LightweightM2M_Core-V1_1-20180710-A.html) to manage this new resource and SenML (https://tools.ietf.org/html/rfc8428) to serialize it. FIG. 4 is a schematic diagram illustrating a non-limiting example of the methods that may be performed by the wireless device 130, which is an LWM2M Client denoted by "Device" in the non-limiting example of FIG. 4, and the network node 110, which is an LWM2M Server denoted by "Manager", and CoAP Client, in the non-limiting example of FIG. 4. Similar setups may be arranged with YANG and RESTCONF, TR-69, or even SNMP. In the non-limiting example in FIG. 4, the wireless device 130 is a constrained device in the communication network 10, which is a 3GPP network comprising the network node 110.

At 401, the wireless device 130 may start to perform LWM2M Bootstrapping and Registration procedures as specified by the OMA DM-LWM2M. As part of these procedures, the wireless device 130 sends a registration message, here, POST coap://[LS-ADDRESS]]/rd?ep=Um:0001. The indication in this case is an End Point (EP) Name, which may be an IMEI. The LWM2M Bootstrapping and Registration procedures may also comprise, at 402, the network node 110 sending a 2.01 Created Location-Path:/rd/123. At 403, the network node 110 discovers whether the capability is available at the wireless device 130 by sending a GET coap://[IPv6]/.well-known/core:

Int: LS→LC

Req: GET coap://[IPv6]/.well-known/core

In response, the wireless device 130 sends, in agreement with Action 201, the first indication to the network node 110 by returning a "2.05 Content" response with the contents of "/band-config", which in this case is the object "LWM2M Band-Config":

Res: 2.05 Content

</band-config>;rt="oma.lwm2m";ct=110

The network node 110 receives the first indication according to Action 301. The network node 110, in agreement with Action 302, performs a GET operation, "GET coap://[IPv6]/band-config", on that particular object:

Int: LS→LC

Req: GET coap://[IPv6]/band-config

The wireless device 130 then returns, in agreement with Action 203, the third indication as a "2.05 Content" response with the following SenML, indicating that it uses band 25 and that has a timeout of 5 seconds before reboot:

```
Res: 2.05 Content
    {"bn": "/XXXX/0/",
     "e": [
        {"n": "0", "v": 25},
        {"n": "1", "v": 25},
        {"n": "2", "v": 27},
        {"n": "3", "v": 5},
        {"n": "4", "v": ""},]
    }
```

In agreement with Action 303, the network node 110 receives the third indication and, in agreement with Action 304, queries its internal database with device profiles, and searches for a suitable configuration, noticing that band 26 is less congested. According to Action 305, the network node 110 sends the fourth indication by performing a POST operation to fine-tune the wireless device 130. For example, the SenML below changes the band to 26 to be better suited in case of overlapping networks:

```
Int: LS -> LC
Req: PATCH coap://[IPv6]/band-config
    {"bn": "/XXXX/0/",
     "e": [{"n": "0","v": 26}]
    }
```

The wireless device 130 receives the fourth indication according to Action 204. In agreement with Action 205, the wireless device 130 then sends the fifth indication by responding with a "2.04 Changed" response to indicate a successful change of the parameter:
Res: 2.04 Changed
The network node 110 receives the fifth indication in agreement with Action 306, and according to Action 307, it restarts the wireless device 130, sending the sixth indication by performing a POST operation on the "Reboot" resource:
Int: LS→LC
Req: POST coap://[IPv6]/band-config/0/5
{"n": "11", "v": " "}
The wireless device 130 finally receives the sixth indication in agreement with Action 206, and reboots itself.

As a general summarized overview of the foregoing, embodiments herein may be understood to provide a mechanism to modify band parameters in a wireless device such as the wireless device 130, using LwM2M. Embodiments herein create a mechanism that allows to configure NB-IoT devices that use the LwM2M protocol, so that they may connect to a preconfigured band, and select the band based on some preconditions, such as max-min frequency, battery, etc. . . .

One advantage of embodiments herein is that they use NB-IoT, CoAP, LwM2M and other standard protocols. Another advantage of embodiments herein is that they allow fine-tuning devices, preventing misconfiguration. A further advantage of embodiments herein is that they do not require a new logic on the LwM2M endpoint. Yet another advantage of embodiments herein is that they enable the possibility to build "auto-tuning" capabilities on LwM2M-NB-IoT systems. For example, the wireless device 130 may have an objective measurement of the quality of a link, such as signal strength or throughput, and then it may change bands until it finds the one with the highest quality.

Figure 5:
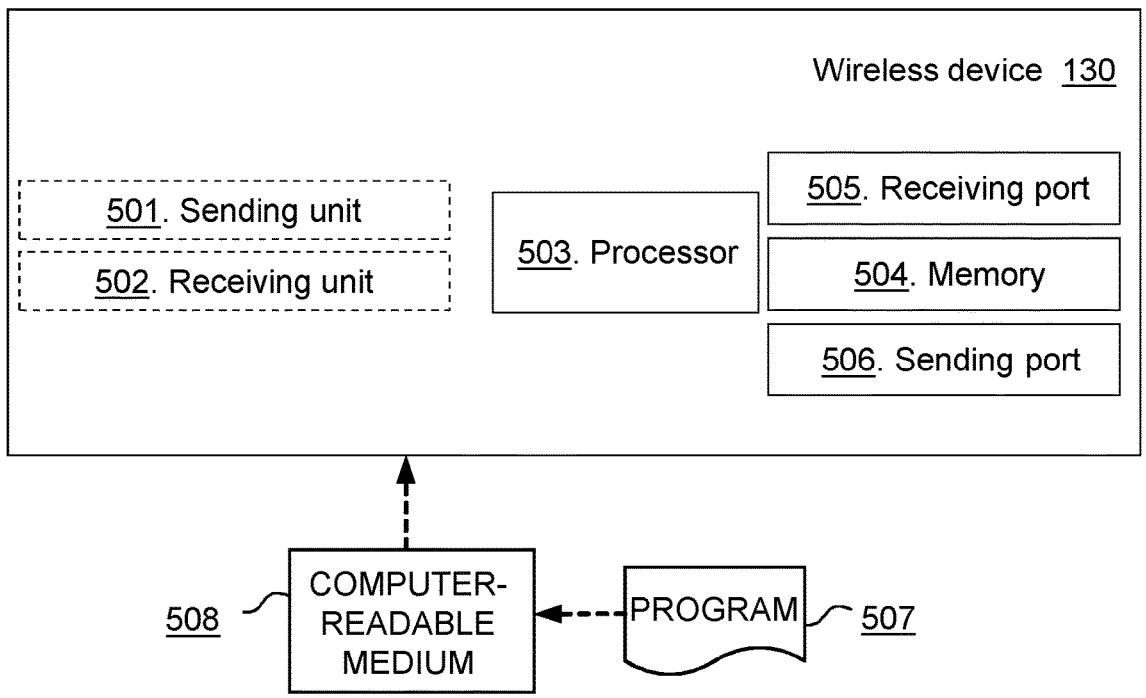
FIG. 5 is a schematic block diagram illustrating two non-limiting examples, a) and b), of a wireless device, according to embodiments herein.
Figure 5:
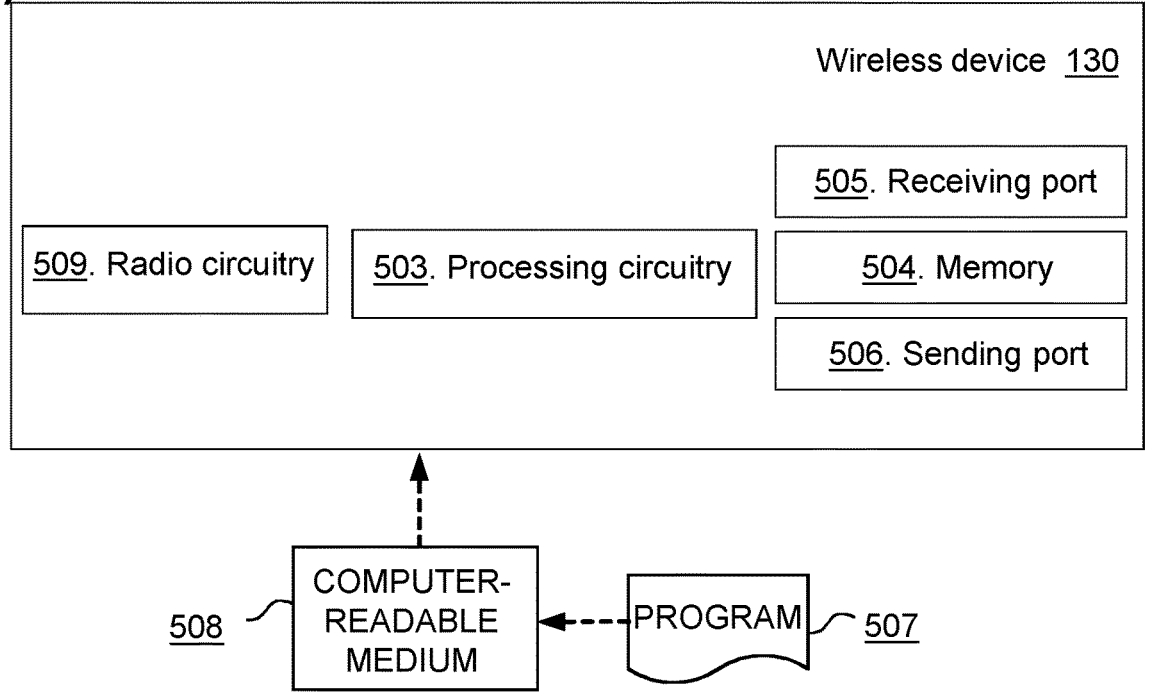

FIG. 5 depicts two different examples in panels a) and b), respectively, of the arrangement that the wireless device 130 may comprise to perform the method actions described above in relation to FIG. 2. The wireless device 130 is configured to operate in the communications network 10.

The detailed description of some of the following corresponds to the same references provided above, in relation to the actions described for the wireless device 130, and will thus not be repeated here. For example, the wireless device 130 may be configured to be a constrained device.

In some embodiments, the wireless device 130 may comprise the following arrangement depicted in FIG. 5a.

The wireless device 130 is configured to, e.g. by means of a sending unit 501 within the wireless device 130 configured to, send the indication to the network node 110 configured to operate in the communications network 10. The indication is configured to indicate the first radio frequency band the wireless device 130 is configured with to scan for discovery and selection of the cell configured to operate in the communications network 10.

In some embodiments, the indication may be configured to be sent in a 2.05 content response.

The wireless device 130 is also configured to, e.g. by means of a receiving unit 502 within the wireless device 130 configured to, receive the another indication from the network node 110. The another indication comprises the first instruction to configure the wireless device 130 to use the second radio frequency band to scan for cell discovery and selection. To send and to receive are configured to be performed using the internet protocol.

In some embodiments, the internet protocol may be configured to be one of: a) LwM2M, b) YANG, c) RESTCONF, d) TR-69, and e) SNMP.

The wireless device 130 may be only configured to use the first radio frequency band based on a fixed rule. The wireless device 130 may be configured to only be enabled to use a radio frequency band other than the first radio frequency band to scan for cell discovery and selection by receiving the another indication from the network node 110.

In some embodiments, to send and to receive may be configured to be performed during a procedure of the wireless device 130 in the communications network 10 configured to be selected from: bootstrapping, device management, service enablement, and firmware update.

In some embodiments, the communications network 10 may be configured to operate on an Internet-of-Things technology.

In some embodiments, the wireless device 130 may be further configured to, e.g. by means of the sending unit 501 within the wireless device 130 configured to, send the first indication to the network node 110. The first indication may be configured to indicate the capability to reconfigure the first configuration for the radio frequency band based on an instruction from the network node 110.

In some embodiments, the wireless device 130 may be further configured to, e.g. by means of the receiving unit 502 within the wireless device 130 configured to, receive the second indication from the network node 110 in response to sending the first indication. The second indication may be configured to indicate the request to provide the first configuration. The indication may be configured to be the third indication. The another indication may be configured to be the fourth indication.

In some embodiment, the indication may be the third indication and the another indication may be the fourth indication. In some of such embodiments, the wireless device 130 may be further configured to, e.g. by means of the sending unit 501 within the wireless device 130 configured to, send the fifth indication to the network node 110.

The fifth indication may be configured to confirm the reconfiguration of the wireless device 130 with the second radio frequency band.

In some embodiment, the indication may be configured to be the third indication and the another indication may be configured to be the fourth indication. In some of such embodiments, the wireless device 130 may be further configured to, e.g. by means of the receiving unit 502 within the wireless device 130 configured to, receive the sixth indication from the network node 110, in response to sending the fifth indication. The sixth indication may be configured to instruct the wireless device 130 to reboot.

The embodiments herein may be implemented through one or more processors, such as a processor 503 in the wireless device 130 depicted in FIG. 5a, together with computer program code for performing the functions and actions of the embodiments herein. The processor 503 may be understood herein to be a hardware component. The program code mentioned above may also be provided as a computer program product, for instance in the form of a data carrier carrying computer program code for performing the embodiments herein when being loaded into the in the wireless device 130. It is however feasible with other data carriers such as a memory stick. The computer program code may furthermore be provided as pure program code on a server and downloaded to the wireless device 130.

The wireless device 130 may further comprise a memory 504 comprising one or more memory units. The memory 504 is arranged to be used to store obtained information, store data, configurations, schedulings, and applications etc. to perform the methods herein when being executed in the wireless device 130.

In some embodiments, the wireless device 130 may receive information from, e.g., the network node 110, through a receiving port 505. In some examples, the receiving port 505 may be, for example, connected to one or more antennas in wireless device 130. In other embodiments, the wireless device 130 may receive information from another structure in the communications network 10 through the receiving port 505. Since the receiving port 505 may be in communication with the processor 503, the receiving port 505 may then send the received information to the processor 503. The receiving port 505 may also be configured to receive other information.

The processor 503 in the wireless device 130 may be further configured to transmit or send information to e.g., the network node 110, through a sending port 506, which may be in communication with the processor 503, and the memory 504.

Any of the sending unit 501 and the receiving unit 502 may be the processor 503 of the wireless device 130, or an application running on such processor.

Those skilled in the art will also appreciate that the sending unit 501 and the receiving unit 502 described above may refer to a combination of analog and digital circuits, and/or one or more processors configured with software and/or firmware, e.g., stored in memory, that, when executed by the one or more processors such as the processor 503, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the wireless device 130 may be respectively implemented by means of a computer program 507 product, comprising instructions, i.e., software code portions, which, when executed on at least one processor 503, cause the at least one processor 503 to carry out the actions described herein, as performed by the wireless device 130. The computer program 507 product may be stored on a computer-readable storage medium 508. The computer-readable storage medium 508, having stored thereon the computer program 507, may comprise instructions which, when executed on at least one processor 503, cause the at least one processor 503 to carry out the actions described herein, as performed by the wireless device 130. In some embodiments, the computer-readable storage medium 508 may be a non-transitory computer-readable storage medium, such as memory stick, or stored in the cloud space. In other embodiments, the computer program 507 product may be stored on a carrier containing the computer program, wherein the carrier is one of an electronic signal, optical signal, radio signal, or the computer-readable storage medium 508, as described above.

The wireless device 130 may comprise an interface unit to facilitate communications between the wireless device 130 and other nodes or devices, e.g., the network node 110. In some particular examples, the interface may, for example, include a transceiver configured to transmit and receive radio signals over an air interface in accordance with a suitable standard.

In other embodiments, the wireless device 130 may comprise the following arrangement depicted in FIG. 5b. The wireless device 130 may comprise a processing circuitry 503, e.g., one or more processors such as the processor 503, in the wireless device 130 and the memory 504. The wireless device 130 may also comprise a radio circuitry 509, which may comprise e.g., the receiving port 505 and the sending port 506. The processing circuitry 503 may be configured to, or operable to, perform the method actions according to FIG. 2 and/or FIG. 4, in a similar manner as that described in relation to FIG. 5a. The radio circuitry 509 may be configured to set up and maintain at least a wireless connection with the network node 110 and/or the radio network node 140. Circuitry may be understood herein as a hardware component.

Hence, embodiments herein also relate to the wireless device 130 operative to operate in the communications network 10. The wireless device 130 may comprise the processing circuitry 503 and the memory 504, said memory 504 containing instructions executable by said processing circuitry 503, whereby the wireless device 130 is further operative to perform the actions described herein in relation to the wireless device 130, e.g., in FIG. 2 and/or FIG. 4.

Figure 6:
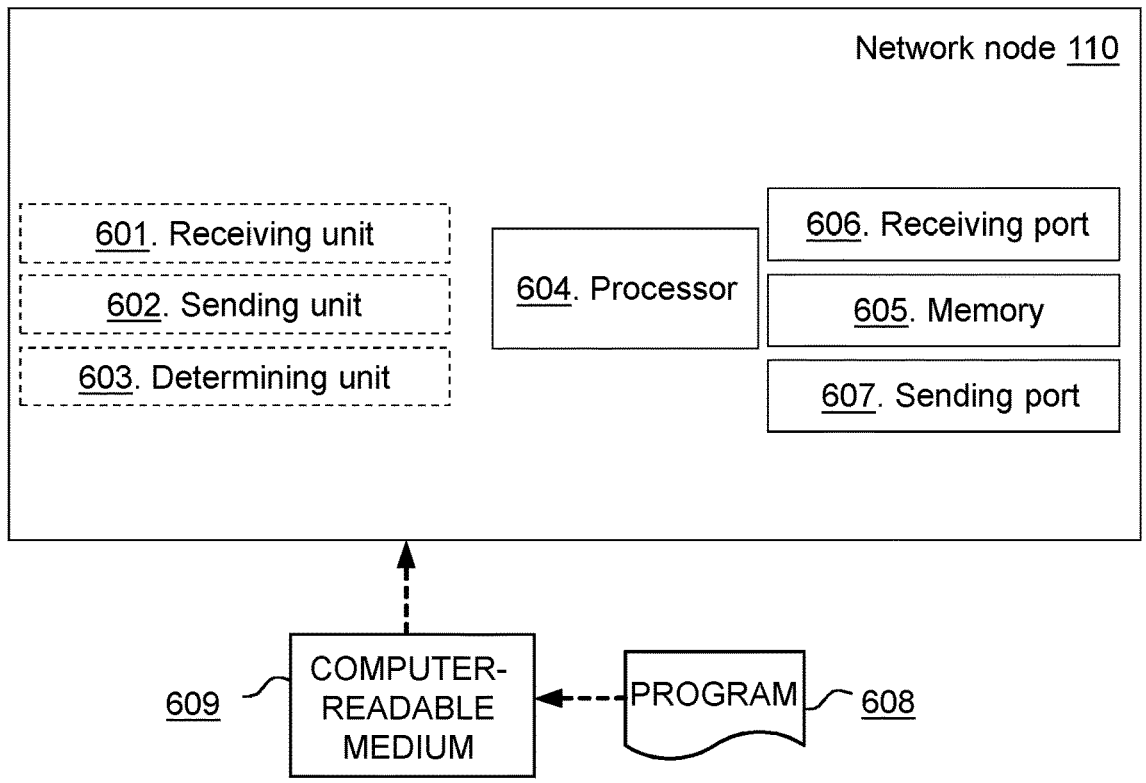
FIG. 6 is a schematic block diagram illustrating two non-limiting examples, a) and b), of a network node, according to embodiments herein.
Figure 6:
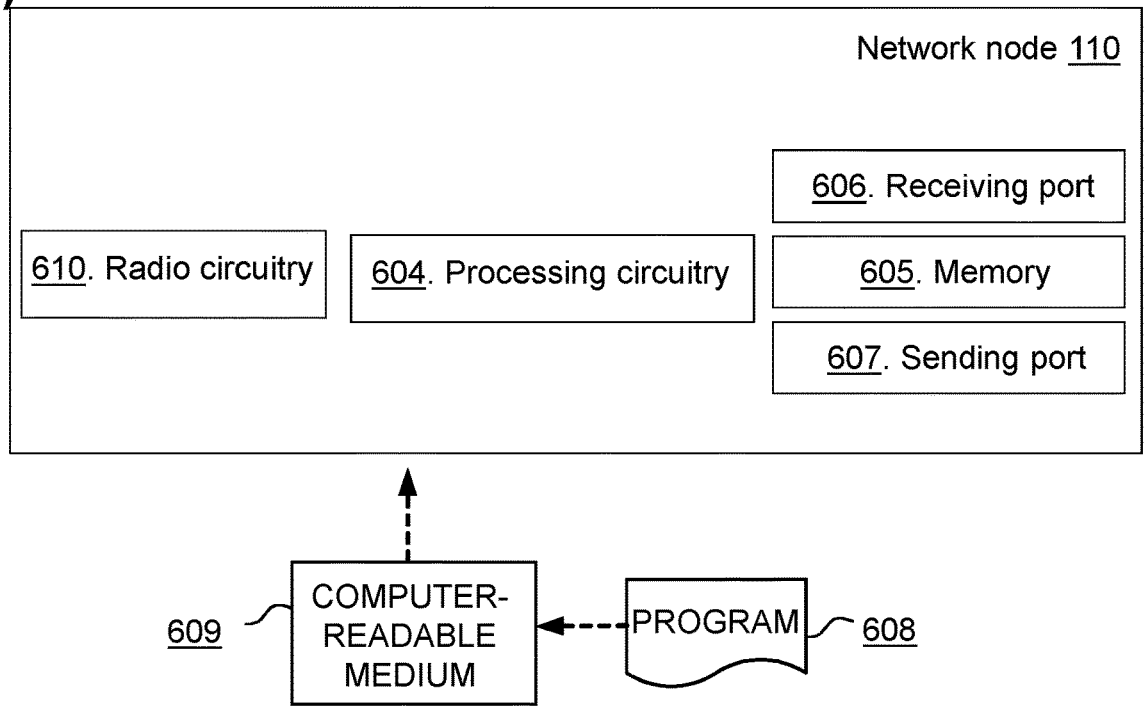

FIG. 6 depicts two different examples in panels a) and b), respectively, of the arrangement that the network node 110 may comprise to perform the method actions described above in relation to FIG. 3. The network node 110 is configured to operate in the communications network 10.

The detailed description of some of the following corresponds to the same references provided above, in relation to the actions described for the network node 110, and will thus not be repeated here. For example, the wireless communications network 10 may be configured to operate on an Internet-of-Things technology.

The network node 110 is configured to, e.g. by means of a receiving unit 601 within the network node 110 configured to, receive the indication from the wireless device 130 configured to operate in the communications network 10. The indication is configured to indicate the first radio frequency band the wireless device 130 is configured with to scan for discovery and selection of a cell configured to operate in the communications network 10.

In some embodiments, the indication may be configured to be received in a 2.05 content response.

The network node 110 is also configured to, e.g. by means of a sending unit 602 within the network node 110 configured to, send the another indication to the wireless device 130. The another indication comprises the first instruction to configure the wireless device 130 to use the second radio frequency band to scan for cell discovery and selection. To receive and to send are configured to be performed using the internet protocol.

In some embodiments, the internet protocol may be configured to be one of: a) LwM2M, b) YANG, c) REST-CONF, d) TR-69, and e) SNMP.

In some embodiments, the wireless device 130 may be only configured to use the first radio frequency band during the bootstrapping procedure based on a fixed rule. The wireless device 130 may be configured to only be enabled to use a radio frequency band other than the first radio frequency band to scan for cell discovery and selection by the network node 110 sending the another indication to the wireless device 130.

In some embodiments, to receive and to send may be configured to be performed during a procedure of the wireless device 130 in the communications network 10 configured to be selected from: bootstrapping, device management, service enablement, and firmware update.

In some embodiments, the wireless device 130 may be configured to be a constrained device.

In some embodiments, the network node 110 may be further configured to, e.g. by means of the receiving unit 601 within the network node 110 configured to, receive the first indication from the wireless device 130. The first indication may be configured to indicate the capability to reconfigure the first configuration based on an instruction from the network node 110.

In some embodiments, the network node 110 may be further configured to, e.g. by means of the sending unit 602 within the network node 110 configured to, send the second indication to the wireless device 130 in response to receiving the first indication. The second indication may be configured to indicate the request to provide the first configuration. The indication may be configured to be the third indication. The another indication may be configured to be the fourth indication.

The network node 110 may be also configured to, e.g. by means of a determining unit 603 within the network node 110 configured to, determine, based on the indication configured to be received, the second radio frequency band to indicate to the wireless device 130. The determining may be configured to be further based on the one or more policies. The another indication configured to be sent may be configured to indicate the second radio frequency band configured to be determined.

In some embodiment, the indication may be configured to be the third indication and the another indication may be configured to be the fourth indication. In some of such embodiments, the network node 110 may be further configured to, e.g. by means of the receiving unit 601 within the network node 110 configured to, receive the fifth indication from the wireless device 130. The fifth indication may be configured to confirm the reconfiguration of the wireless device 130 with the second radio frequency band.

In some embodiment, the indication may be configured to be the third indication and the another indication may be configured to be the fourth indication. In some of such embodiments, the network node 110 may be further configured to, e.g. by means of the sending unit 602 within the network node 110 configured to, send the sixth indication to the wireless device 130, in response to receiving the fifth indication. The sixth indication may be configured to instruct the wireless device 130 to reboot.

The embodiments herein may be implemented through one or more processors, such as a processor 604 in the network node 110 depicted in FIG. 6, together with computer program code for performing the functions and actions of the embodiments herein. The processor 604 may be understood herein to be a hardware component. The program code mentioned above may also be provided as a computer program product, for instance in the form of a data carrier carrying computer program code for performing the embodiments herein when being loaded into the in the network node 110. One such carrier may be the cloud 120. It is however feasible with other data carriers such as a memory stick. The computer program code may furthermore be provided as pure program code on a server and downloaded to the network node 110.

The network node 110 may further comprise a memory 605 comprising one or more memory units. The memory 605 is arranged to be used to store obtained information, store data, configurations, schedulings, and applications etc. to perform the methods herein when being executed in the network node 110.

In some embodiments, the network node 110 may receive information from, e.g., the wireless device 130, through a receiving port 606. In some examples, the receiving port 606 may be, for example, connected to one or more antennas in the network node 110. In other embodiments, the network node 110 may receive information from another structure in the communications network 10 through the receiving port 606. Since the receiving port 606 may be in communication with the processor 604, the receiving port 606 may then send the received information to the processor 604. The receiving port 606 may also be configured to receive other information.

The processor 604 in the network node 110 may be further configured to transmit or send information to e.g., the wireless device 130, through a sending port 607, which may be in communication with the processor 604, and the memory 605.

Any of the receiving unit 601, the sending unit 602 and the determining unit 603 may be the processor 604 of the network node 110, or an application running on such processor.

Those skilled in the art will also appreciate that the receiving unit 601, the sending unit 602 and the determining unit 603 described above may refer to a combination of analog and digital circuits, and/or one or more processors configured with software and/or firmware, e.g., stored in memory, that, when executed by the one or more processors such as the processor 604, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the network node 110 may be respectively implemented by means of a computer program 608 product, comprising instructions, i.e., software code portions, which, when executed on at least one processor 604, cause the at least one processor 604 to carry out the actions described herein, as performed by the network node 110. The computer program 608 product may be stored on a computer-readable storage medium 609. The computer-readable storage medium 609, having stored thereon the computer program 608, may comprise instructions which, when executed on at least one processor 604, cause the, at least, one processor 604 to carry out the actions described herein, as performed by the network node 110. In some embodiments, the computer-readable storage medium 609 may be a non-transitory computer-readable storage medium, such as a memory stick, or stored in the cloud space. In other embodiments, the computer program 608 product may be stored on a carrier containing the computer program, wherein the carrier is one of an electronic signal, optical signal, radio signal, or the computer-readable storage medium 609, as described above.

The network node 110 may comprise an interface unit to facilitate communications between the network node 110 and other nodes or devices, e.g., the network node 110. In some particular examples, the interface may, for example, include a transceiver configured to transmit and receive radio signals over an air interface in accordance with a suitable standard.

In other embodiments, the network node 110 may comprise the following arrangement depicted in FIG. 6b. The network node 110 may comprise a processing circuitry 604, e.g., one or more processors such as the processor 604, in the network node 110 and the memory 605. The network node 110 may also comprise a radio circuitry 610, which may comprise e.g., the receiving port 606 and the sending port 607. The processing circuitry 604 may be configured to, or operable to, perform the method actions according to FIG. 3 and/or FIG. 4, in a similar manner as that described in relation to FIG. 6a. The radio circuitry 610 may be configured to set up and maintain at least a wireless connection with the wireless device 130. Circuitry may be understood herein as a hardware component.

Hence, embodiments herein also relate to the network node 110 operative to operate in the communications network 10. The network node 110 may comprise the processing circuitry 604 and the memory 605, said memory 605 containing instructions executable by said processing circuitry 604, whereby the network node 110 is further operative to perform the actions described herein in relation to the network node 110, e.g., in FIG. 3 and/or FIG. 4.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method performed by a wireless device, the wireless device operating in a communications network, the method comprising:
sending an indication to a network node operating in the communications network, the indication indicating a first radio frequency band the wireless device is configured with to scan for discovery and selection of a cell operating in the communications network; and
receiving another indication from the network node, the another indication comprising a first instruction to configure the wireless device to use a second radio frequency band to scan for cell discovery and selection, wherein
the sending and the receiving are performed using an internet protocol.

2. The method of claim 1, wherein the wireless device is only configured to use the first radio frequency band based on a fixed rule, and wherein the wireless device is only enabled to use a radio frequency band other than the first radio frequency band to scan for cell discovery and selection by receiving the another indication from the network node.

3. The method of claim 1, wherein the sending and the receiving are performed during a procedure of the wireless device in the communications network selected from: bootstrapping, device management, service enablement, and firmware update.

4. The method of claim 1, wherein the internet protocol is one of: a) Lightweight Machine to Machine, LwM2M, b) YANG, c) RESTCONF, d) TR-69, and e) Simple network management protocol, SNMP.

5. The method of claim 1, wherein the communications network operates on an Internet-of-Things technology.

6. The method of claim 1, wherein the wireless device is a constrained device.

7. The method of claim 1, wherein the indication is sent in a 2.05 content response.

8. The method of claim 1, further comprising:
sending a first indication to the network node, the first indication indicating a capability to reconfigure a first configuration for a radio frequency band based on an instruction from the network node; and
receiving a second indication from the network node in response to sending the first indication, the second indication indicating a request to provide the first configuration, and wherein the indication is a third indication, and the another indication is a fourth indication.

9. The method of claim 1, wherein
the indication is a third indication and the another indication is a fourth indication, and
the method further comprises:
sending a fifth indication to the network node, the fifth indication confirming the reconfiguration of the wireless device with the second radio frequency band; and
receiving a sixth indication from the network node, in response to sending the fifth indication, the sixth indication instructing the wireless device to reboot.

10. The method of claim 1, further comprising:
sending a first indication to the network node, the first indication indicating a capability to reconfigure a first configuration for a radio frequency band based on an instruction from the network node.

11. The method of 1, wherein
the method further comprises, prior to sending the indication to the network node, receiving a request message transmitted by the network node,
the request message is configured to trigger the wireless device to provide the indication to the network node by containing a band configuration object identifier, and
the wireless device sends the indication to the network node in response to receiving the request message.

12. The method of claim 1, wherein
the indication is a third indication and the another indication is a fourth indication, and
the method further comprises:
sending a fifth indication to the network node, the fifth indication confirming the reconfiguration of the wireless device with the second radio frequency band.

13. The method of claim 12, further comprising:
receiving a sixth indication from the network node, in response to sending the fifth indication, the sixth indication instructing the wireless device to reboot.

14. A method performed by a network node, the network node operating in a communications network, the method comprising:
receiving an indication from a wireless device operating in the communications network, the indication indicating a first radio frequency band the wireless device is configured with to scan for discovery and selection of a cell operating in the communications network, and
sending another indication to the wireless device, the another indication comprising a first instruction to configure the wireless device to use a second radio frequency band to scan for cell discovery and selection, wherein
the receiving and the sending are performed using an internet protocol.

15. The method of claim 14, wherein the receiving and the sending are performed during a procedure of the wireless device in the communications network selected from: bootstrapping, device management, service enablement, and firmware update.

16. The method of claim 14, wherein the internet protocol is one of: a) Lightweight Machine to Machine, LwM2M, b) YANG, c) RESTCONF, d) TR-69, and e) Simple network management protocol, SNMP.

17. The method of claim 14, wherein the wireless communications network operates on an Internet-of-Things technology.

18. The method of claim 14, wherein the wireless device is a constrained device.

19. The method of claim 14, wherein the indication is received in a 2.05 content response.

20. The method of claim 14, further comprising:
determining, based on the received indication, the second radio frequency band to indicate to the wireless device, the determining being further based on one or more policies, and wherein the sent another indication indicates the determined second radio frequency band.

21. The method of claim 14, further comprising:
receiving a first indication from the wireless device, the first indication indicating a capability to reconfigure the first configuration based on an instruction from the network node, and
sending a second indication to the wireless device in response to receiving the first indication, the second indication indicating a request to provide the first configuration, and wherein the indication is a third indication, and the another indication is a fourth indication.

22. The method of claim 14, wherein the indication is a third indication and the another indication is a fourth indication, and wherein the method further comprises:
receiving a fifth indication from the wireless device, the fifth indication confirming the reconfiguration of the wireless device with the second radio frequency band, and
sending a sixth indication to the wireless device, in response to receiving the fifth indication, the sixth indication instructing the wireless device to reboot.

23. A wireless device, the wireless device comprising:
processing circuitry; and
a memory containing instructions executable by the processing circuitry, wherein the wireless device is configured to operate in a communications network, and the wireless device being further configured to:
send an indication to a network node configured to operate in the communications network, the indication being configured to indicate a first radio frequency band the wireless device is configured with to scan for discovery and selection of a cell configured to operate in the communications network,
receive another indication from the network node, the another indication comprising a first instruction to configure the wireless device to use a second radio frequency band to scan for cell discovery and selection, wherein to send and to receive are configured to be performed using an internet protocol.

24. A network node, the network node comprising:
processing circuitry; and
a memory containing instructions executable by the processing circuitry, wherein the network node is configured to operate in a communications network, and the network node being further configured to:
receive an indication from a wireless device configured to operate in the communications network, the indication being configured to indicate a first radio frequency band the wireless device is configured with to scan for discovery and selection of a cell configured to operate in the communications network,
send another indication to the wireless device, the another indication comprising a first instruction to configure the wireless device to use a second radio frequency band to scan for cell discovery and selection, wherein to receive and to send are configured to be performed using an internet protocol.

* * * * *